(12) United States Patent
Lee et al.

(10) Patent No.: US 12,668,033 B2
(45) Date of Patent: Jun. 30, 2026

(54) METHODS OF FABRICATING INFRARED BANDPASS FILTERS AND INFRARED BANDPASS FILTERS FABRICATED THEREBY

(71) Applicant: Purdue Research Foundation, West Lafayette, IN (US)

(72) Inventors: Chi Hwan Lee, West Lafayette, IN (US); Bongjoong Kim, West Lafayette, IN (US); Zahyun Ku, Beavercreek, OH (US); Augustine Urbas, Oakwood, OH (US); Jehwan Hwang, West Lafayette, IN (US)

( * ) Notice: Subject to any disclaimer, the term of this patent is extended or adjusted under 35 U.S.C. 154(b) by 381 days.

(21) Appl. No.: 18/048,596

(22) Filed: Oct. 21, 2022

(65) Prior Publication Data

US 2024/0367398 A1     Nov. 7, 2024

Related U.S. Application Data

(60) Provisional application No. 63/270,815, filed on Oct. 22, 2021.

(51) Int. Cl.
| | |
|---|---|
| *B29D 11/00* | (2006.01) |
| *G02B 5/20* | (2006.01) |
| *B29K 33/00* | (2006.01) |
| *B29K 63/00* | (2006.01) |

(52) U.S. Cl.
CPC ........ *B29D 11/00634* (2013.01); *G02B 5/208* (2013.01); *B29K 2033/12* (2013.01); *B29K 2063/00* (2013.01); *G02B 2207/101* (2013.01)

(58) Field of Classification Search
CPC .............. B29D 11/00634; G02B 5/208; G02B 2207/101; G02B 1/002; G02B 5/008; B29K 2033/12; B29K 2063/00
See application file for complete search history.

(56) References Cited

U.S. PATENT DOCUMENTS

2021/0229987 A1 *   7/2021   Lee ...................... B82B 3/0014

OTHER PUBLICATIONS

Kim, B. et al., "Deterministic Nanoassembly of Quasi-Three-Dimensional Plasmonic Nanoarrays with Arbitrary Substrate Materials and Structures", Nano Lett. 2019, 19, pp. 5796-5805.
Stewart, M.E. et al., "Nanostructured Plasmonic Sensors", Chem. Rev. 2008, 108, pp. 494-521.

* cited by examiner

*Primary Examiner* — Abbas Rashid
*Assistant Examiner* — Adrianna N Konves

(57)     ABSTRACT

Methods of fabricating infrared bandpass filters and infrared bandpass filters fabricated thereby. The methods include forming metallic and dielectric spacer layers on a mold that defines nanoscale-sized recesses or protuberances, depositing a stress-absorbing layer on the dielectric spacer layer opposite the mold, and applying a force to the stress-absorbing layer to peel a first intermediate structure comprising the metallic layer, the dielectric spacer layer, and the stress-absorbing layer from the mold. The stress-absorbing layer may be dissolved from the first intermediate structure with a solvent to define a second intermediate structure. The second intermediate structure may be transferred to a receiver substrate to define the IR bandpass filter. The recesses or protuberances of the metallic and dielectric spacer layers are configured to function as quasi-three-dimensional (quasi-3D) plasmonic metal-dielectric hybrid nanostructures.

18 Claims, 15 Drawing Sheets

Quasi-3D Nanoposts

Quasi-3D Nanoholes

Quasi-3D Nanoposts

Quasi-3D Nanoholes

METHODS OF FABRICATING INFRARED BANDPASS FILTERS AND INFRARED BANDPASS FILTERS FABRICATED THEREBY

CROSS-REFERENCE TO RELATED APPLICATIONS

This application claims the benefit of provisional U.S. Patent Application No. 63/270,815 filed Oct. 22, 2021, the contents of which are incorporated herein in its entirety.

STATEMENT REGARDING FEDERALLY SPONSORED RESEARCH OR DEVELOPMENT

This invention was made with government support under CMMI-1928784 awarded by the National Science Foundation and FA2386-18-1-4104 awarded by the Air Force Office of Scientific Research. The government has certain rights in the invention.

BACKGROUND OF THE INVENTION

The present invention generally relates to infrared (IR) bandpass filters and methods of fabricating IR bandpass filters and related structures.

Infrared (IR) bandpass filters have served as critical optical elements of multispectral imaging systems for a wide range of applications including space-based imaging, remote sensing, military target tracking, land mine detection, diagnostic medicine, and environmental monitoring. IR bandpass filters are typically constructed by forming a Fabry-Perot optical cavity that comprises alternating layers of low- and high-indices dielectric spacers. The bandpass filtering effects with desired spectral selectivity are obtained through the precise design of plasmonic nanoarchitectures (e.g., nanostructures including nanoantennas) configured into various forms such as metal disks, metal holes, metal coaxial apertures, split-ring resonators, coherent perfect absorbers, and quasi-three-dimensional (quasi-3D) crystals.

Existing methods for the fabrication of these plasmonic nanoantennas have generally relied on the use of conventional nanolithography techniques by exploiting electron-beam, focused ion-beam, nanoimprint, or interference lithography on a rigid, flat wafer. Despite great progress over the past decades, these approaches are limited by the laborious, complex, and time-consuming nature of nanolithography techniques, thereby impeding their application in wide-ranging use.

In view of the above, it can be appreciated that there are certain problems, shortcomings or disadvantages associated with methods of fabricating IR bandpass filters, and that it would be desirable if methods were available that were capable of at least partly overcoming or avoiding the excessive labor, complexity, and time associated with existing nanolithography-based methods.

BRIEF DESCRIPTION OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, methods of fabricating infrared (IR) bandpass filters, IR bandpass filters produced thereby, and structures used in their fabrication.

According to one nonlimiting aspect of the invention, a method is provided for fabrication of an infrared (IR) bandpass filter that includes forming metallic and dielectric spacer layers on a mold, the metallic and dielectric spacer layers comprising nanoscale-sized recesses or protuberances defined by the mold, depositing a stress-absorbing layer on the dielectric spacer layer opposite the mold, applying a force to the stress-absorbing layer to peel a first intermediate structure comprising the metallic layer, the dielectric spacer layer, and the stress-absorbing layer from the mold, selectively removing the stress-absorbing layer from the first intermediate structure with a first solvent configured to dissolve the stress-absorbing layer to define a second intermediate structure comprising the metallic layer and the dielectric spacer layer, and transferring the second intermediate structure to a receiver substrate to define the IR bandpass filter. The recesses or protuberances of the metallic and dielectric spacer layers are configured to function as quasi-three-dimensional (quasi-3D) plasmonic metal-dielectric hybrid nanostructures.

According to another nonlimiting aspect of the invention, a method is provided for fabrication of an infrared (IR) bandpass filter that includes providing a mold comprising an array of nanoscale-sized recesses or protuberances, depositing a sacrificial material on the array of nanoscale-sized recesses or protuberances of the mold to form a sacrificial layer thereon, depositing a metallic material comprising gold (Au) on the sacrificial layer such that the metallic material is received within the recesses or between the protuberances of the mold to form a metallic layer thereon, depositing a dielectric material on the metallic layer that is received within the recesses or between the protuberances of the mold to form a dielectric spacer layer thereon, depositing a stress-absorbing material comprising an acrylic on the dielectric spacer layer to form a stress-absorbing layer thereon, performing an etching process to selectively remove the sacrificial layer, applying an adhesive, water-soluble film to the stress-absorbing layer, applying a force to the stress-absorbing layer by pulling on the water-soluble film to peel a first intermediate structure from the mold, wherein the first intermediate structure comprises the water-soluble film, the metallic layer, the dielectric spacer layer, and the stress-absorbing layer, selectively removing the water-soluble film from the first intermediate structure by dissolving the water-soluble film with water to define a second intermediate structure comprising the metallic layer, the dielectric spacer layer, and the stress-absorbing layer, selectively removing the stress-absorbing layer from the second intermediate structure by dissolving the stress-absorbing layer with acetone to define a third intermediate structure comprising the metallic layer and the dielectric spacer layer, and transferring the third intermediate structure to a receiver substrate to define the IR bandpass filter. The metallic and dielectric spacer layers comprise nanoholes or nanoposts formed by the array of nanoscale-sized recesses or protuberances of the mold. The nanoholes or nanoposts of the metallic and dielectric spacer layers are configured to function as quasi-three-dimensional (quasi-3D) plasmonic metal-dielectric hybrid nanostructures.

Additional nonlimiting aspects of the invention include IR bandpass filters fabricated with methods of the type described above. The resulting IR bandpass filter may have the dielectric spacer layer disposed on the substrate and the metallic layer disposed on the dielectric spacer layer.

In a further nonlimiting aspect of the invention, a combination of a mold and an intermediate structure for forming an IR bandpass filter is provided. The combination includes the mold having a nanostructure on a surface thereof, and the intermediate structure disposed on the nanostructure of the mold. The intermediate structure includes a metallic layer disposed on and conforming to a shape of the nanostructure, a dielectric spacer layer coupled to the metallic layer, a stress-absorbing layer coupled to the dielectric spacer layer, and an adhesive, water-soluble film adhesively coupled to the stress-absorbing layer. The combination is configured such that pulling on the water-soluble film removes the intermediate structure from the mold.

Technical effects of the methods described above in some configurations may include the ability to fabricate IR filters in a time- and cost-effective manner, for example, in a manner that reduces the labor, complexity, and time associated with existing nanolithography-based methods. In some cases, the mold may be reused to fabricate multiple IR filters further contributing to the cost-effectiveness of the methods. Other aspects and advantages of this invention will be appreciated from the following detailed description.

BRIEF DESCRIPTION OF THE DRAWINGS

FIGS. 1A and 1B represent single units of quasi-3D metal-dielectric IR filters configured into nanostructures, namely, nanoposts (FIG. 1A) and nanoholes (FIG. 1). FIGS. 1C and 1D include corresponding optical and SEM images of nanoposts (FIG. 1C) and nanoholes (FIG. 1D) on a receiver substrate.

FIGS. 2A and 2B represent FEM results displaying the distribution of e for the nanoposts (FIG. 2A) and nanoholes (FIG. 2B) with (top panel) and without (bottom panel) a PMMA layer during a debonding step of the fabrication method. FIGS. 2C and 2D represent corresponding bending stiffness and $\varepsilon_{max}$ of the (c) nanoposts and (d) nanoholes as a function of the PMMA thickness.

FIGS. 3A and 3B schematically represent nanoposts (FIG. 3A) and nanoholes (FIG. 3B) during debonding from an edge. FIGS. 3C and 3D represent local strains of the nanoposts (FIG. 3C) and nanoholes (FIG. 3D) with and without the presence of a PMMA layer.

FIGS. 4A and 4B represent experimental (measurement) and computational (simulation) results for the transmission filter effect of quasi-3D nanostructures (nanoantennas) that contain the nanoposts and nanoholes, respectively. FIGS. 4C and 4D represent 2D surface plots of normalized transmission for the IR filters as functions of wavelength and periodicity (p). FIGS. 4E and 4F represent the corresponding results of the IR filters that contain a PMMA spacer as a control comparison.

DETAILED DESCRIPTION OF THE INVENTION

Figure 1A:
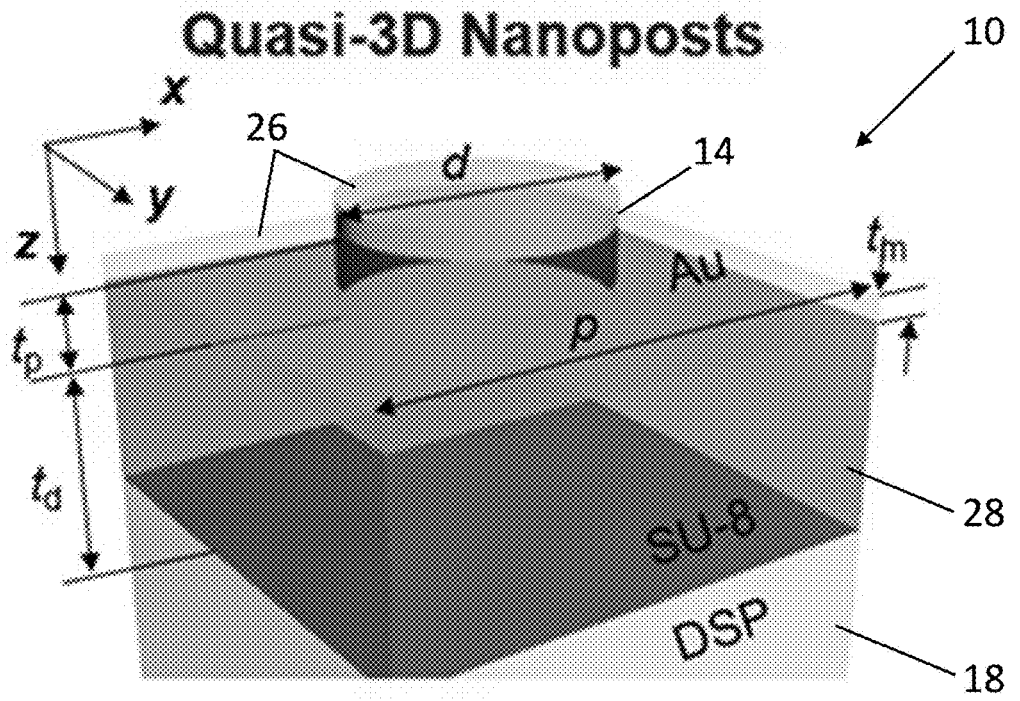
FIGS. 1A through 1D represent various aspects of IR filters in accordance with certain nonlimiting aspects of the invention.

The intended purpose of the following detailed description of the invention and the phraseology and terminology employed therein is to describe what is shown in the drawings, which relate to one or more nonlimiting embodiments of the invention, and to describe certain but not all aspects of the embodiment(s) to which the drawings relate. The following detailed description also describes certain investigations relating to the embodiment(s) depicted in the drawings, and identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

Disclosed herein are mechanically and optically reliable infrared (IR) bandpass filters (also referred to herein as IR filters) built upon quasi-3D plasmonic metal-dielectric hybrid nanostructures (including nanoantennas) with dielectric spacers that provide a capability to control light at nanoscale length scale beyond the diffraction limit, which enables powerful optical manipulation techniques. Methods are disclosed for fabrication of the IR filters that enable repetitive replication of these nanostructures from molds with tailored optical features for infrared bandpass filtering. These features allow the IR filters to be fabricated in a time- and cost-effective manner. In some embodiments, the methods of fabricating IR bandpass filters may include a step of providing a stress-absorbing layer such that an intermediate structure of an IR bandpass filter may be removed from a mold and subsequently transferred to a receiver substrate in a manner that reduces the likelihood of or prevents defects in relatively brittle components of the IR bandpass filter.

In general, the methods include physical transfer of quasi-3D metal-dielectric hybrid nanoarchitectures from donor silicon (Si) molds to foreign receiver substrates (e.g., photodetectors). The methods overcome an inherent extreme brittleness of IR transparent dielectric spacers, as a nonlimiting example, SU-8 (an epoxy-based negative photoresist whose composition is reported to be based on a multifunctional bisphenol A novolak epoxy resin) having a fracture strain of about 2% to about 3%, with the use of a temporary stress-absorbing layer that reduces the likelihood of or prevents mechanical damage of a brittle dielectric spacer. Following complete removal of the stress-absorbing layer, the resulting IR filters are capable of spectral filtering in the IR region with respect to the peak transmission and full width at half maximum (FWHM).

Figure 1B:
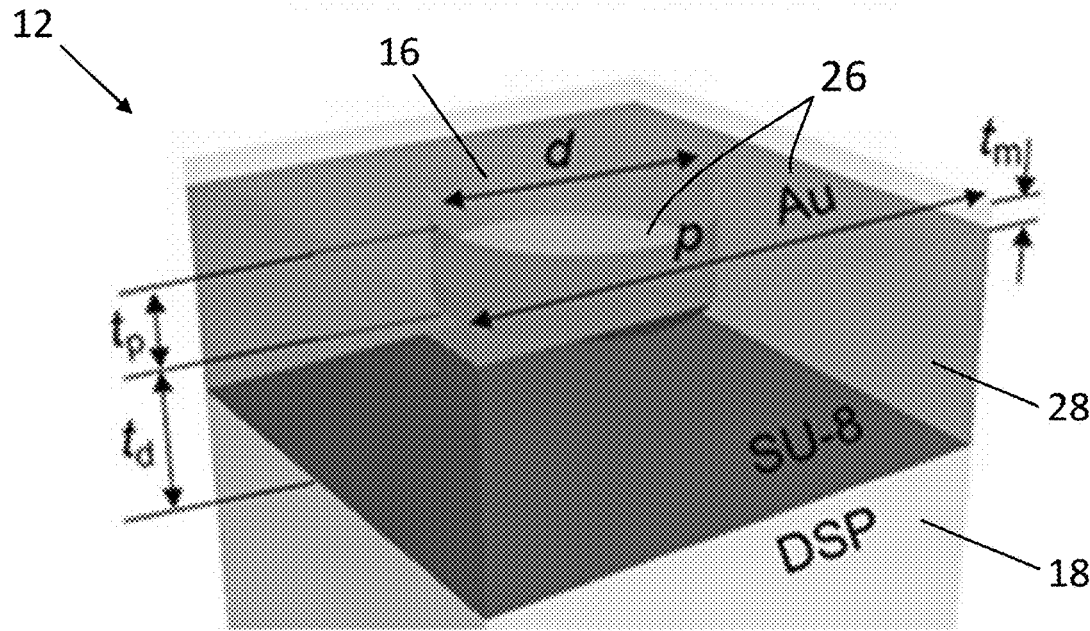

FIGS. 1A and 1B schematically represent single units of quasi-3D metal-dielectric (e.g., Au layer on a brittle dielectric spacer layer formed of SU-8) IR filters 10 and 12 configured into nanostructures, namely, nanoposts 14 and nanoholes 16, respectively, on double-side polished (DSP) Si wafers 18. The geometrical parameters of the IR filters 10 and 12 are denoted as follows: periodicity (p), diameter of the nanoposts and nanoholes (d), height or depth of the nanoposts and the nanoholes ($t_p$), thickness of the perforated Au films ($t_n$), and thickness of the dielectric spacer layer ($t_d$).

Figure 5:
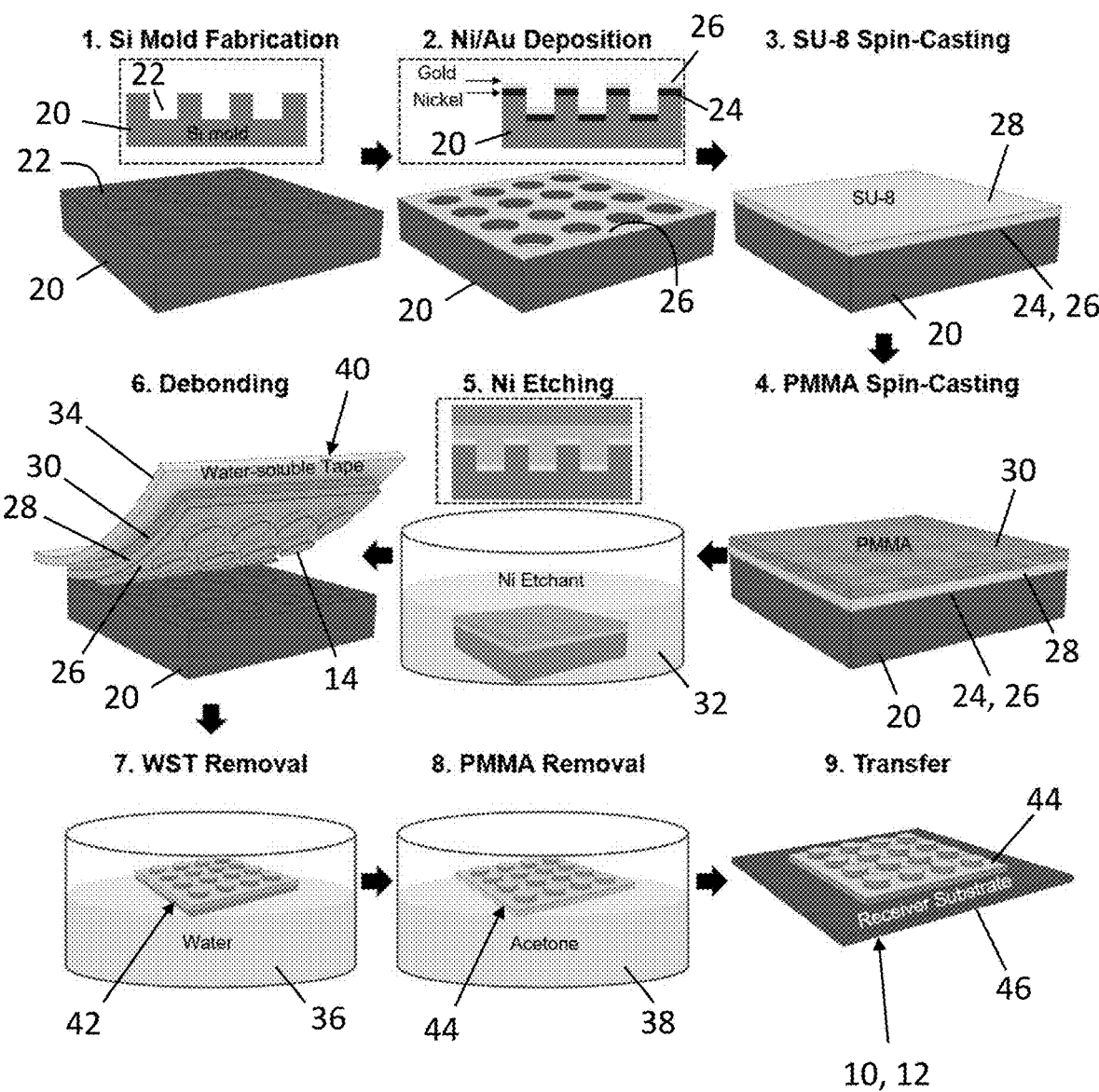
FIG. 5 schematically represents certain aspects of a nonlimiting method for fabrication of a quasi-3D metal-dielectric (Au array-SU-8 spacer) IR filter configured into nanoposts in accordance with certain nonlimiting aspects of the invention.

FIG. 5 schematically represents a nonlimiting method of fabricating IR filters having this structure divided into nine steps. In step one, a donor Si mold 20 is prepared that contains preformed quasi-3D nanoposts and/or nanoholes. For example, in FIG. 5 the mold 20 includes an array of recesses that each represent a nanohole 22. The mold 20 may be prepared, for example, via electron beam (e-beam) lithography. In step two, thin metallic layers (films) 24 and 26 of ductile metallic materials may be deposited on the Si mold 20, for example, using an e-beam evaporator. As nonlimiting examples, a 10 nm-thick Ni metallic layer 24 may be deposited directly onto the surface of the mold 20 having the nanoposts 14 and/or nanoholes 16 formed thereon, and a 50 nm-thick Au metallic layer 26 may be deposited onto the metallic layer 24 such that Au is deposited within the recesses (nanoholes 16) and/or between the protuberances (nanoposts 14) of the mold 20. In step three, a brittle dielectric spacer layer 28 (e.g., a 600 nm-thick layer formed of SU-8) may be deposited on the metallic layers 24 and/or 26. In step four, a layer 30 of a stress-absorbing material (e.g., an acrylic, in this nonlimiting example polymethylmethacrylate (PMMA) at a thickness of about 1 μm) is deposited on the dielectric spacer layer 28. Deposition of the dielectric spacer layer 28 and the stress-absorbing layer 30 may be, for example, via spin-casting. In step five, the entire structure may be immersed in a bath of etchant 32 configured to selectively etch the underlying Ni layer 24 (serving as a sacrificial layer), and then rinsed with distilled (DI) water. In step six, a water-soluble adhesive tape 34 may be attached to a top surface of the stress-absorbing layer 30 to form first intermediate structure 40 and then gently peeled to selectively remove the remaining metallic layer 26, the dielectric spacer layer 28, and the stress-absorbing layer 30 to be cleanly delaminated from the mold 20. In step seven the water-soluble adhesive tape 34 may be subsequently removed by immersion into a bath of water 36 to form a second intermediate structure 42 of the metallic layer 26, the dielectric spacer layer 28, and the stress-absorbing layer 30. In step eight, the stress-absorbing layer 30 may be subsequently removed by immersion into a bath of a solvent 38 of the stress-absorbing material (e.g., acetone for PMMA) to form a third intermediate structure 44 of the metallic layer 26 and the dielectric spacer layer 28. Both the water-soluble adhesive tape 34 and the stress-absorbing layer 30 may be removed sequentially in steps seven and eight. In step nine, the resulting third intermediate structure 44 formed of the metallic layer 26 and the dielectric spacer layer 28 having quasi-3D nanostructures (nanoantennas that contain nanoposts 14 and/or nanoholes 16) may be transferred to a desired receiver substrate 46, such as a DSP wafer 18.

Figures 1C, 1D:
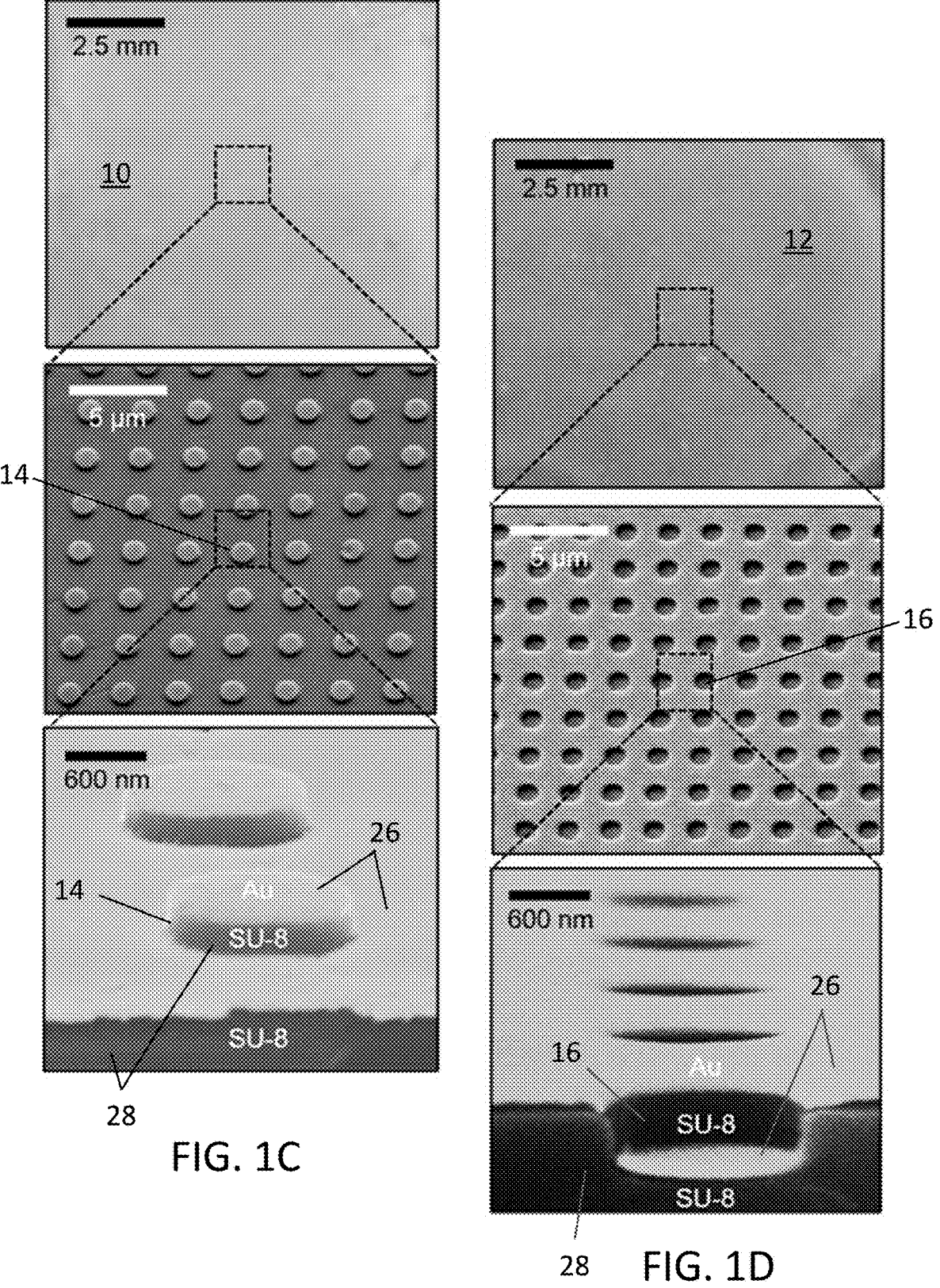

FIGS. 1C and 1D present a series of optical and scanning electron microscopy (SEM) images of IR filters 10 and 12 on the DSP Si wafers 18 that were fabricated in accordance with the previously described method. The IR filters 10 and 12 exhibited no evidence of visible damages or defects across an entire surface thereof. The enlarged tilted-angle and cross-sectional views of the SEM images (bottom panels) highlight the clear physical separation at the gap between the dielectric spacer layer 28 (SU-8) and the metallic layer 26

Figure 6:
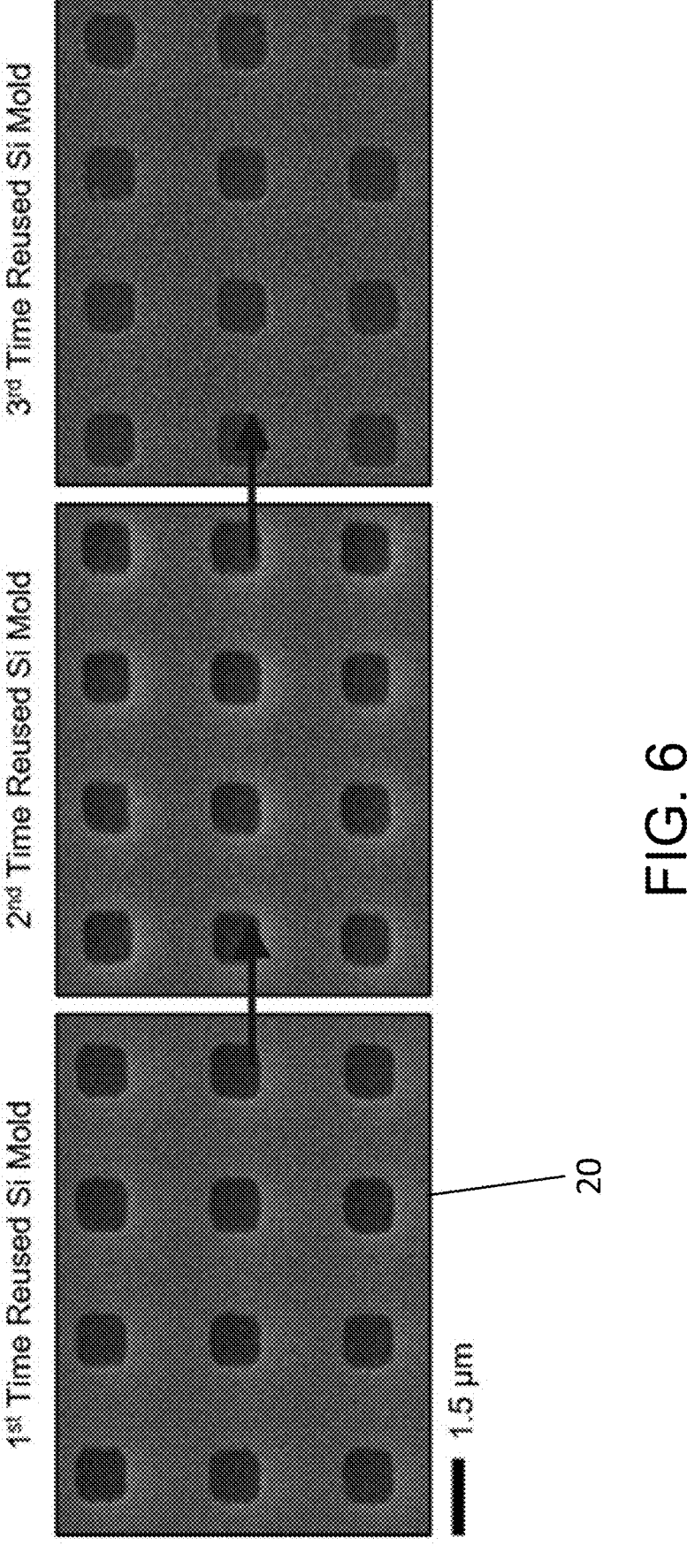
FIG. 6 represents SEM images of a donor Si mold throughout multiple replication processes.

(Au) without degradation. Importantly, the mold 20 was intact throughout the entire process, allowing the mold 20 to be reused for multiple replications of IR filters 10 and/or 12 with a piranha cleaning after each use. FIG. 6 represents a mold 20 after subsequent uses. The replicability of the mold 20 can obviate the need for iterative implementation of e-beam lithography that has been typically required for previous IR filter fabrication methods.

Nonlimiting embodiments of the invention will now be described in reference to experimental investigations leading up to the invention. In these investigations, IR filters and 12 were fabricated in accordance with the previously-described method and experimentally tested to determine the effect of the structure of these IR filters on IR bandpass filtering. These physical investigations were validated with computational analysis using finite integration technique (FIT) and finite element method (FEM).

For the investigations described hereinafter, the molds 20 used for producing the IR filters 10 and 12 were fabricated by producing a quasi-3D array of circle-shaped apertures (i.e., pillars or holes) on a Si wafer through the photolithographic patterning of a negative (positive)-tone photoresist. A thin layer (i.e., about 20 nm thick) of chromium (Cr) was then deposited the array to serve as a mask layer using an electron beam (e-beam) evaporator. A predominately anisotropic $CF_4/O_2$ plasma reactive ion etch (RIE) was applied to generate an undercut at the RF power of 100 W with $CF_4$ (13 sccm) and 02 (2 sccm) gases under the pressure of 45 mTorr. Finally, the Cr mask layer was removed by immersing in a bath of a Cr etchant for thirty seconds to complete a Si mold. The orthogonal pitches of both the 2D gratings $P_x$ (pitch along x-axis) and the py (pitch along y-axis) were fixed at 3.0 μm (px=py=p). The diameter of the circular pillar or holes were fixed at 1.2 μm.

The resulting molds 20 were used to fabricate IR filters 10 and 12 in accordance with the previously-described method to produce IR filters comprising an Au metallic layer 26 (50 nm thick) and a dielectric spacer layer 28 (600 nm-thick SU-8) with an array of nanoposts 14 or nanoholes 16 formed therein. PMMA was used as the stress-absorbing layer 30. The resulting IR filters 10 and 12 were imaged via FEM. In these IR filters, the dielectric spacer layer 28 served as an IR transparent spacer through which light can transmit at a wavelength of 3 to 10 μm.

Figure 2A:
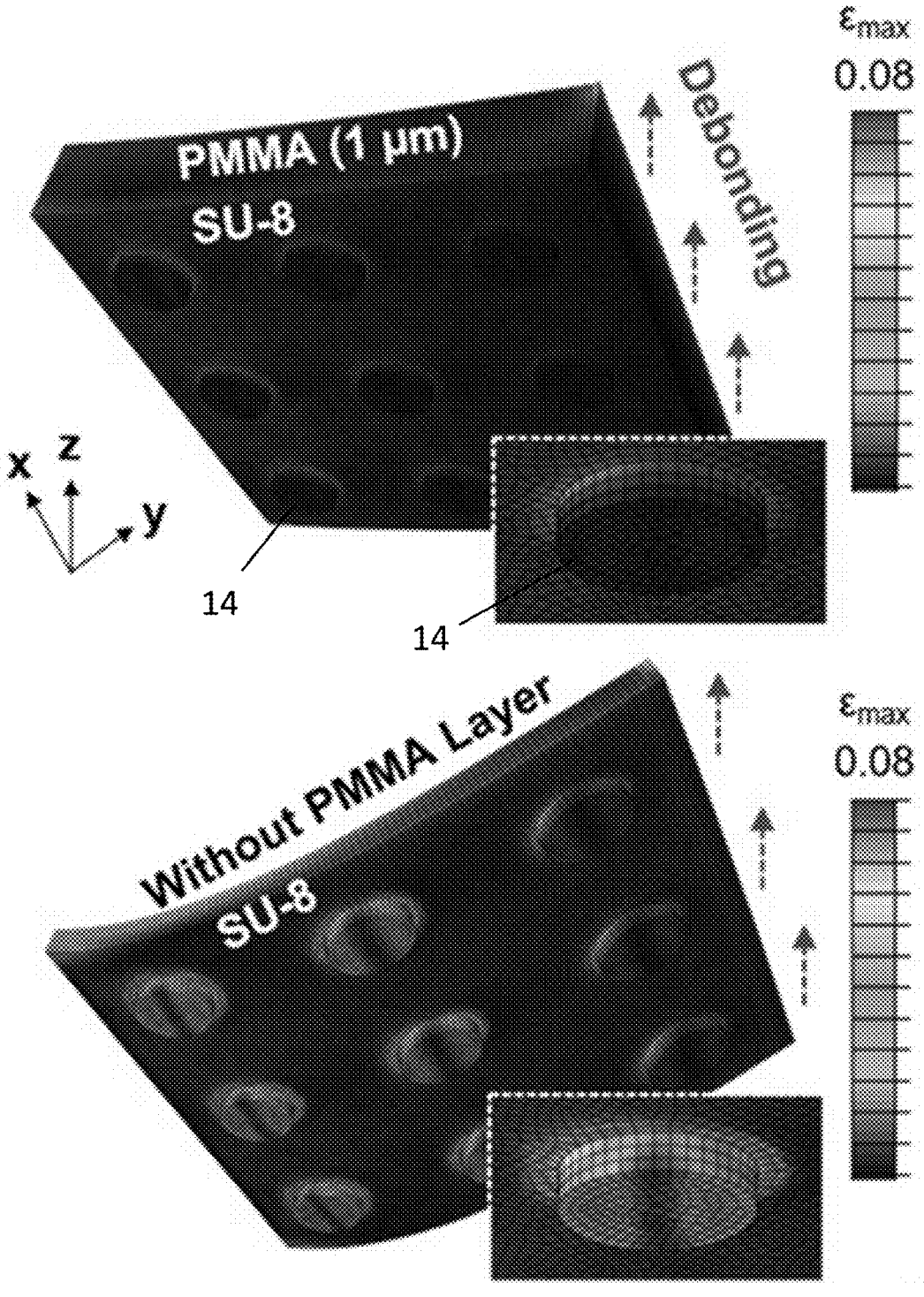
FIGS. 2A through 2D represent certain stress characteristics of the IR filters of FIGS. 1A and 1B during fabrication thereof.

The FEM images indicated that the IR filters 10 and 12 were substantially defect-free, despite the presence of the extremely brittle dielectric spacer layer (SU-8) 28. This lack of defects was attributed to the use of the temporary stress-absorbing layer 30 (PMMA) that was capable of efficiently accommodating induced strains under mechanical deformations (i.e., the debonding process). FIG. 2A presents FEM results displaying a distribution of principal strain (e) for a 3×3 array of quasi-3D nanoposts 14 (p=3 μm; d=1.2 μm; $t_m$=50 nm; $t_p$=250 nm; $t_d$=400 nm) with (top panel) and without (bottom panel) a PMMA layer (1 μm) under the debonding process at the peeling force of 40 mN.

Figure 2B:
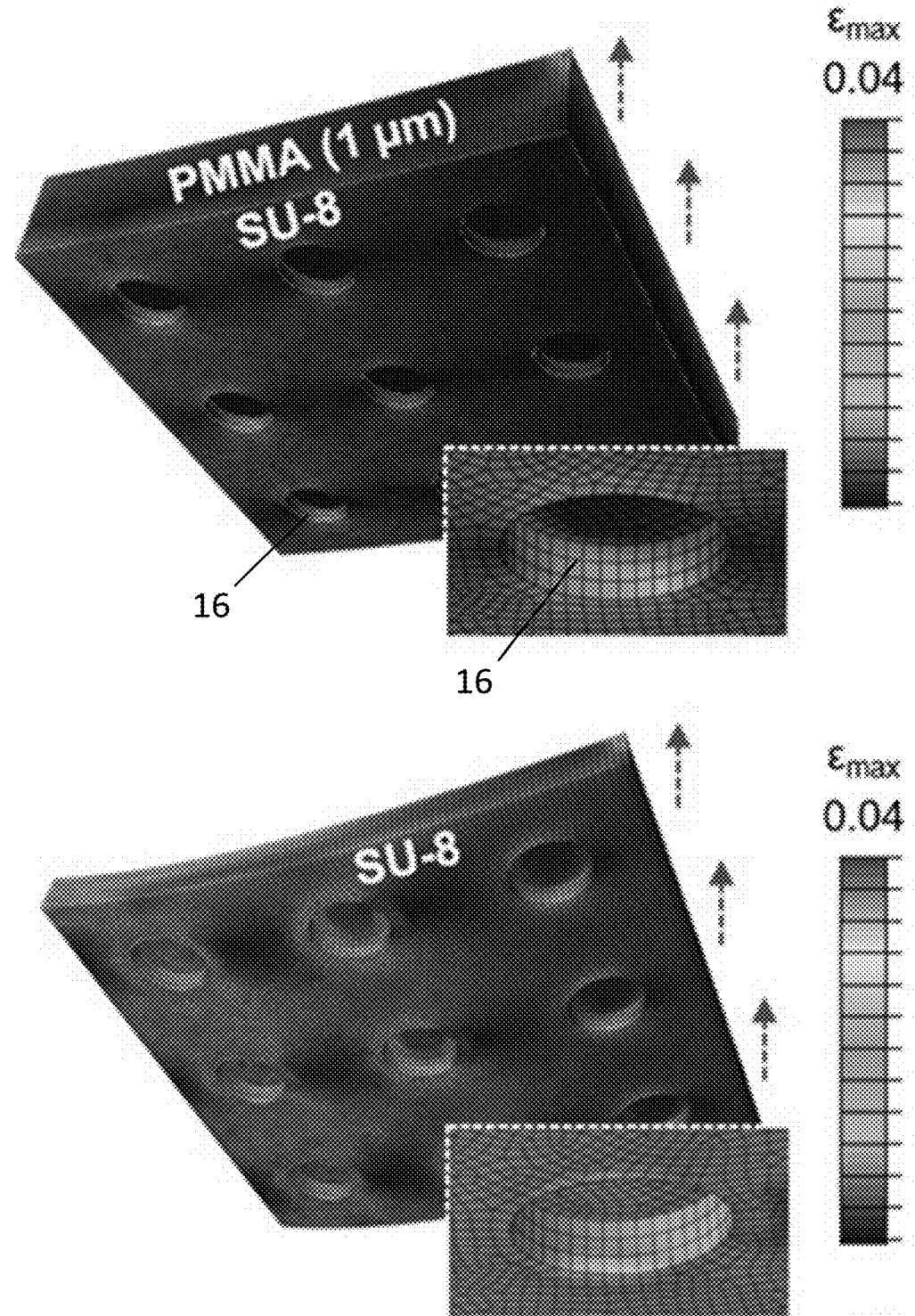
Figure 2C:
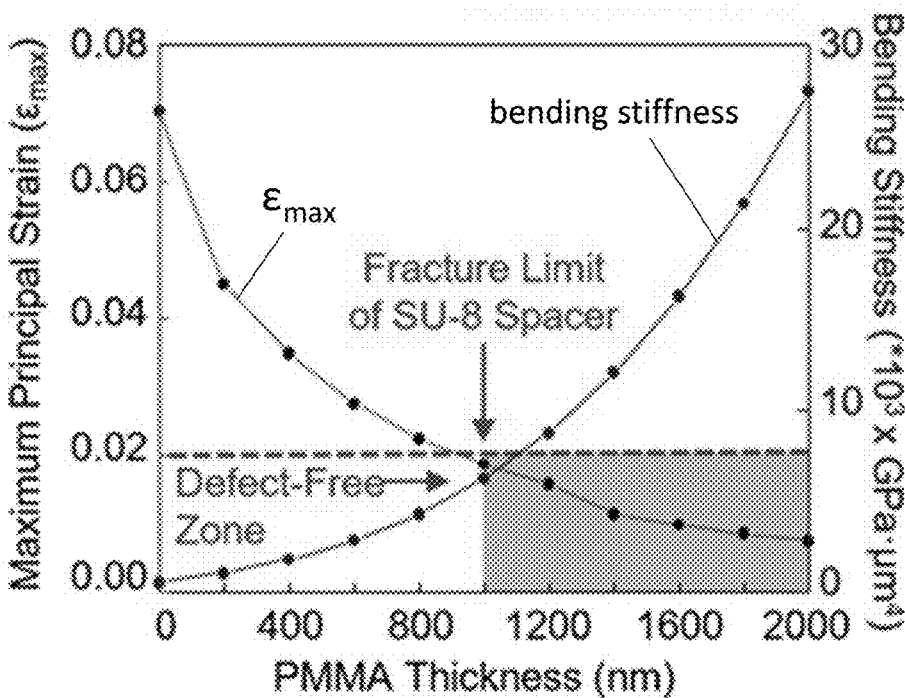
Figure 2D:
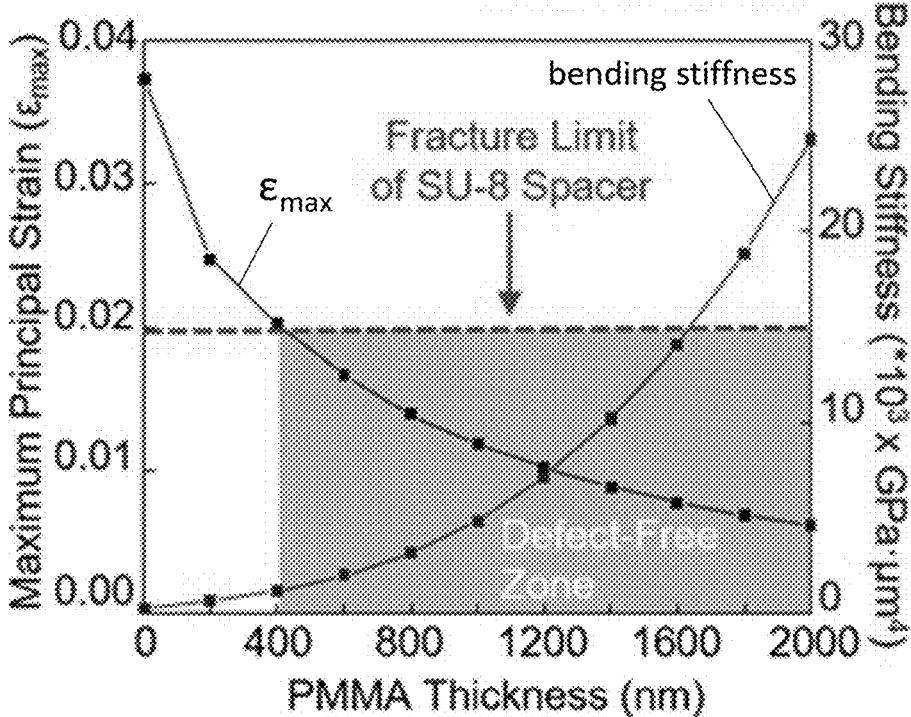
Figure 7:
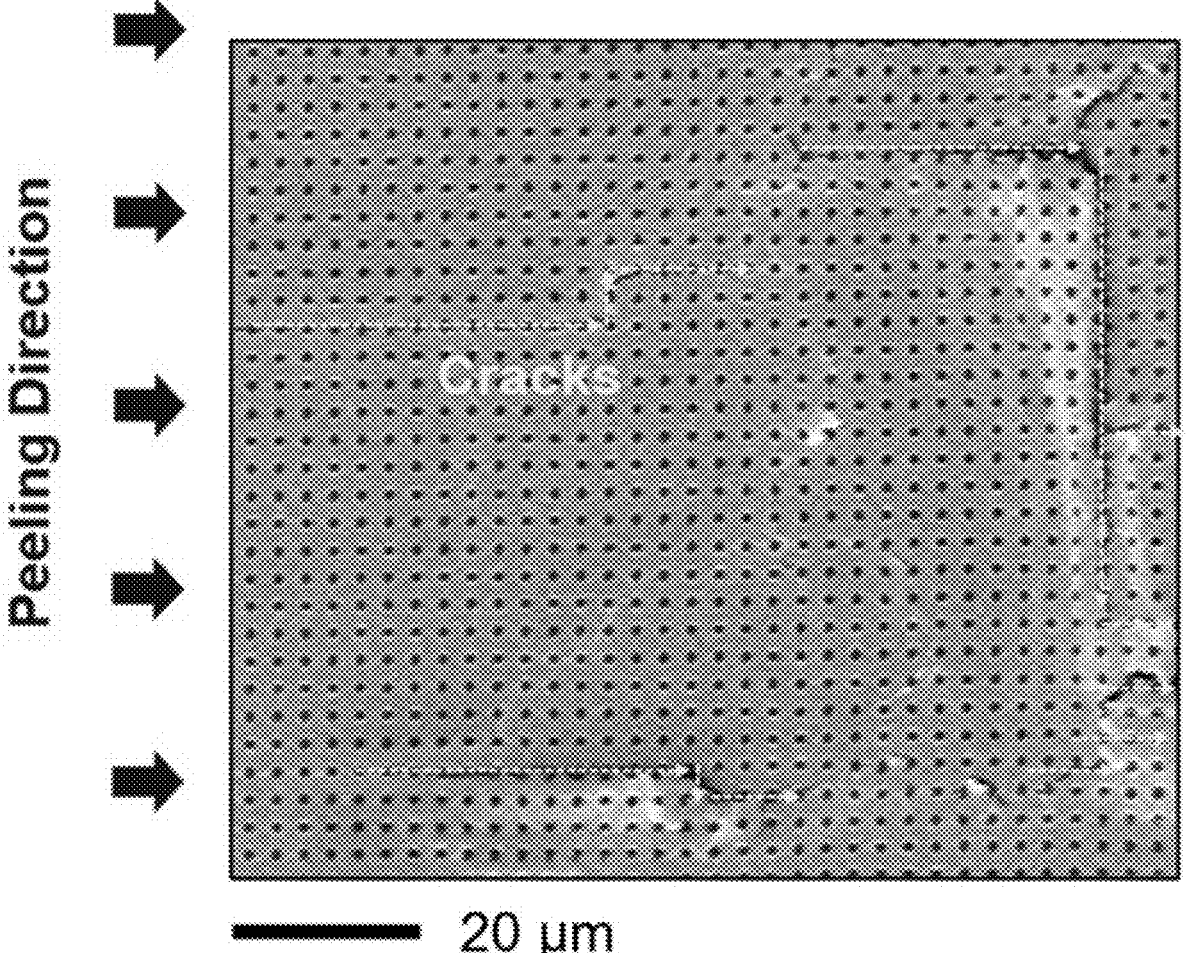
FIG. 7 represents an SEM image of damaged IR filters when processed out of the defect-free zone.
Figure 8A:
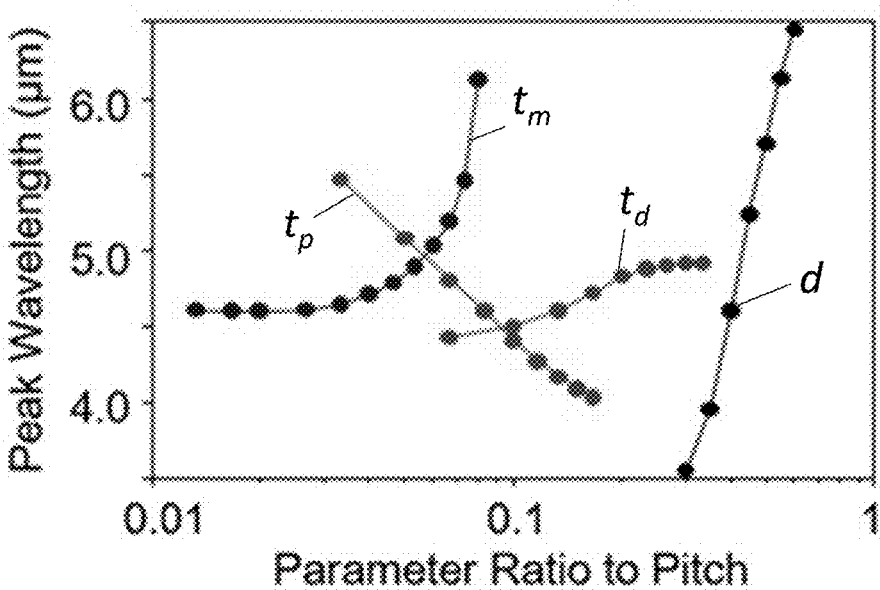
FIGS. 8A through 8D represent experimental results of peak wavelength and FWHM for IR filters with varied geometric parameters (d, $t_p$, $t_m$, $t_d$).
Figure 8B:
Figure 8B:
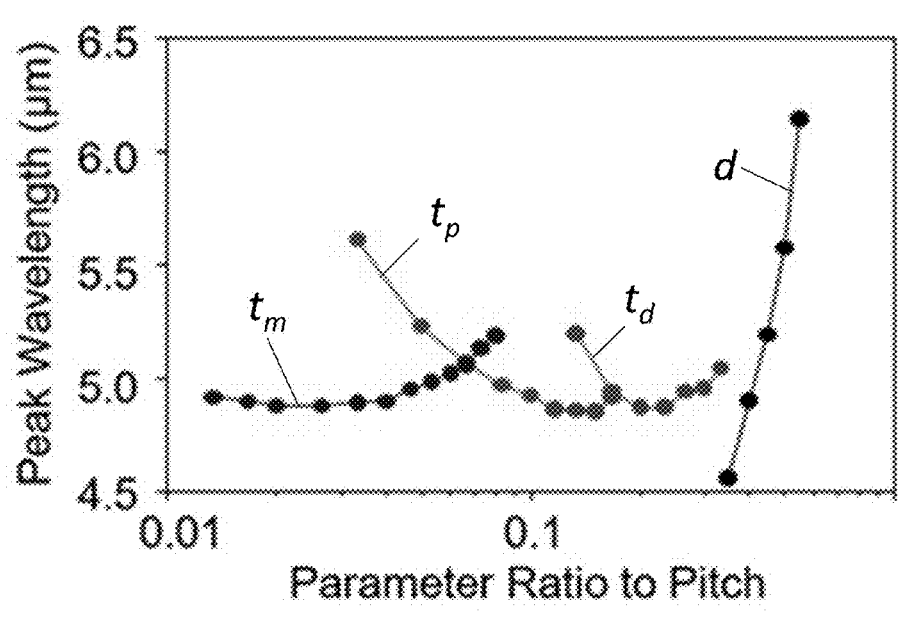
Figure 8C:
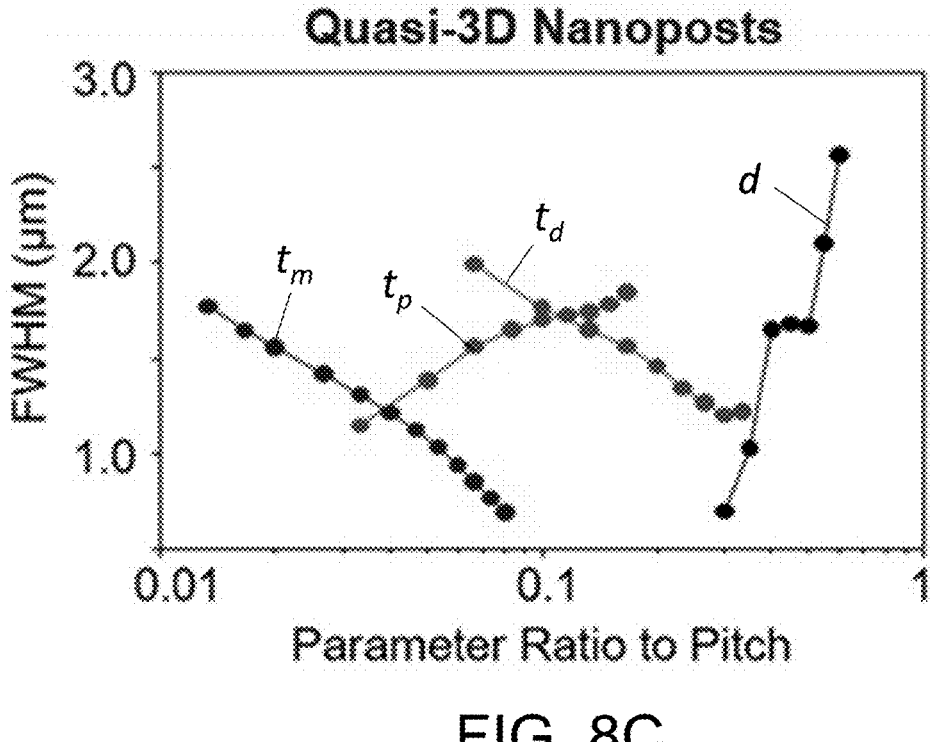
Figure 8D:
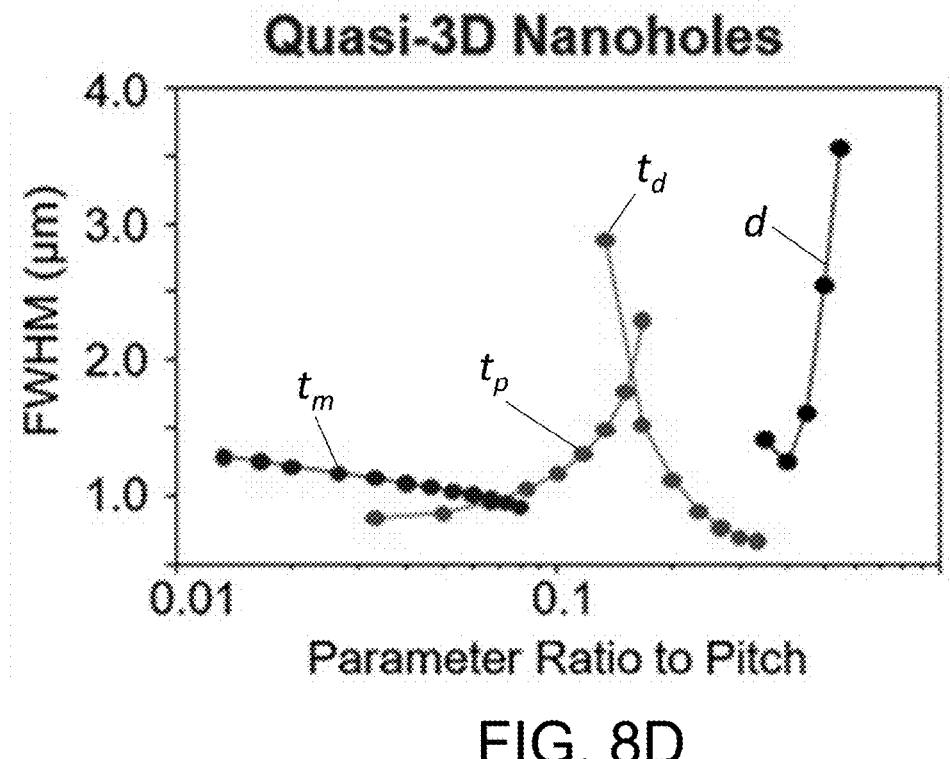

These results show that maximum strains ($\varepsilon_{max}$) appeared at the edge of the nanoposts 14 and nanoholes 16 where the stress concentration occurred (inset images). The $\varepsilon_{max}$ of the nanoposts was less than 1.8% with the presence of the PMMA layer, which was below the fracture limit of the SU-8 spacer (ε=2-3%). In contrast, the $\varepsilon_{max}$ of the nanoposts increased up to 7.1% with the absence of the PMMA layer, which thereby may lead to cracking through the dielectric spacer layer 28. The corresponding results for a 3×3 array of quasi-3D nanoholes 16 (p=3 μm; d=1.2 μm; $t_m$=50 nm, $t_p$=330 nm, $t_d$=230 nm) are shown in FIG. 2B, producing consistent outcomes. The $\varepsilon_{max}$ of the nanoholes 16 decreased from 3.7% to 1.2%, by more than 3-fold, with the presence of the PPMA stress-absorbing layer 30. These results confirmed that the stress-absorbing layer 30 was effective to protect the brittle dielectric spacer layer 28 from fracture throughout the debonding process (e.g., step 6 described previously). This was mainly attributed to the increased bending stiffness of the entire structure (first intermediate structure 40) with the presence of the stress-absorbing layer 30. FIGS. 2C and 2D present the bending stiffness and the $\varepsilon_{max}$ of the nanoposts 14 and nanoholes 16 as a function of the thickness of the stress-absorbing layer 30, respectively. The bending stiffness dramatically increased from 0.3 to $28 \times 10^3$ GPa·μm$^4$ with increasing thickness of the stress-absorbing layer 30 from 0.001 to 2 μm, which also resulted in the exponential decrease of the $\varepsilon_{max}$ for both the nanoposts and the nanoholes. The shaded areas in these graphs indicate zones where the defect-free debonding process occurred at the $\varepsilon_{max}$ below the fracture limit of the SU-8 spacer ($\varepsilon = 2-3\%$). The results also indicated that the stress-absorbing layer 30 is preferably thicker than at least about 1 μm and 0.4 μm for the defect-free debonding of the nanoposts 14 and nanoholes 16, respectively. Representative images of the damaged IR filter that includes a PMMA layer thinner than these thresholds are shown in FIG. 7.

Figure 3A:
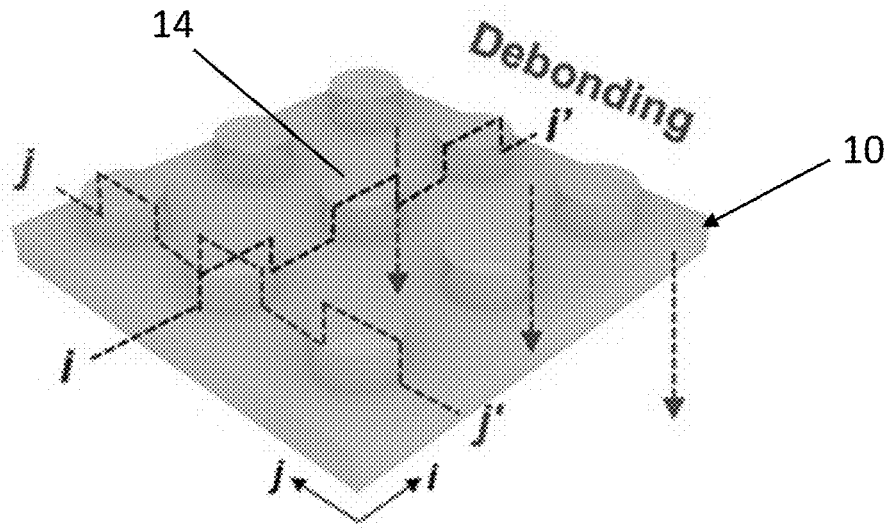
FIGS. 3A through 3D represent certain aspects of a fracture mechanics analysis of the fabrication of the IR filters of FIGS. 1A and 1B.
Figure 3B:
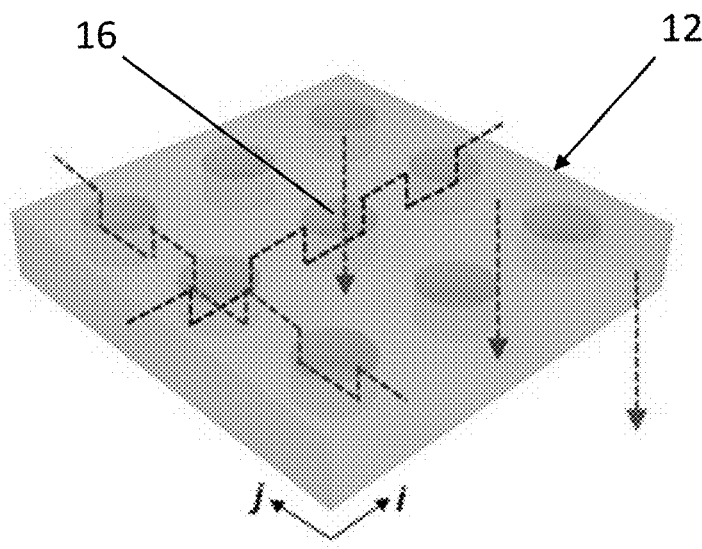
Figures 3C, 3D:
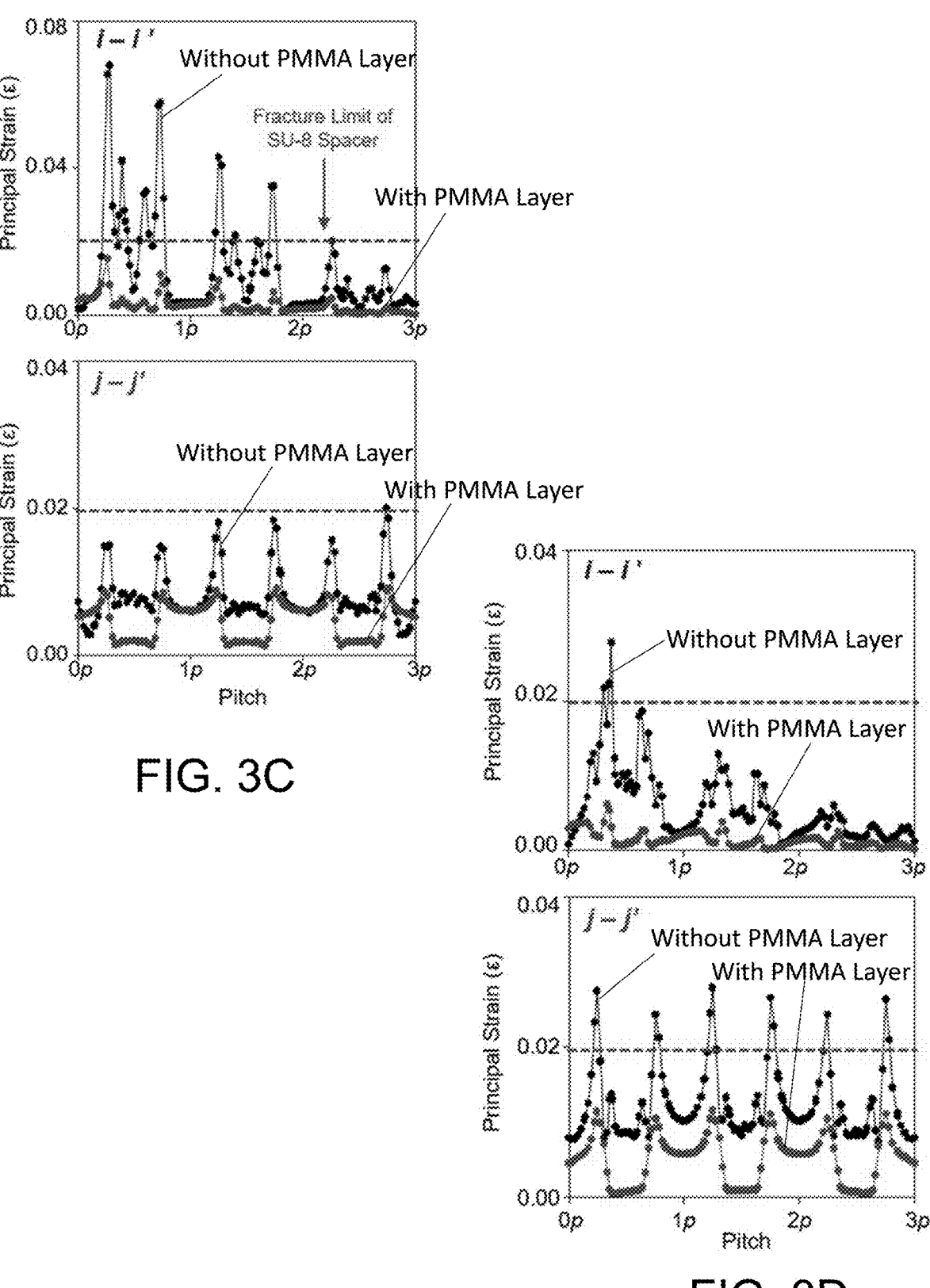

FIGS. 3A and 3B schematically represent 3×3 square arrays of the nanoposts and nanoholes, respectively, under the debonding process from an edge. The dashed lines show the surface topology along the i-i' and j-j' directions. The corresponding FEM results in FIGS. 3C and 3D revealed local strains of the nanoposts 14 and nanoholes 16 with and without the presence of a stress-absorbing layer 30 (1 μm-thick). Without the stress-absorbing layer 30, the peak strains were sharply localized at the edges of the nanoposts 14 and nanoholes 16 along both directions. The localized peak strains were attenuated along the direction of applied peeling force (i.e., i-i' direction) while they were unchanged in its perpendicular direction (i.e., j-j' direction). Overall, the localized peak strains along the i-i' direction were larger than those along the j-j' direction, all of which were beyond or near the fracture limit of the SU-8 dielectric spacer layer 28 (e of about 2% to about 3%). These results implied that cracks were most likely to be initiated at the edge of where the peeling force was applied and then preferentially propagated along the i-i' direction relative to than the j-j' direction, as also evidenced in FIG. 7. With the stress-absorbing layer 30, the sharp localization of peak strains at the edges of the nanoposts 14 and nanoholes 16 was alleviated due to the stress-absorbing effect. This also resulted in a substantial reduction of the localized peak strains, by at least 57%, below the fracture limit of the SU-8 spacer along both directions. These observations were consistent with those in FIGS. 2A through 2D, providing insight into identifying an optimal condition for the defect-free debonding of various quasi-3D nanoarchitectures with high-fidelity.

Figure 4A:
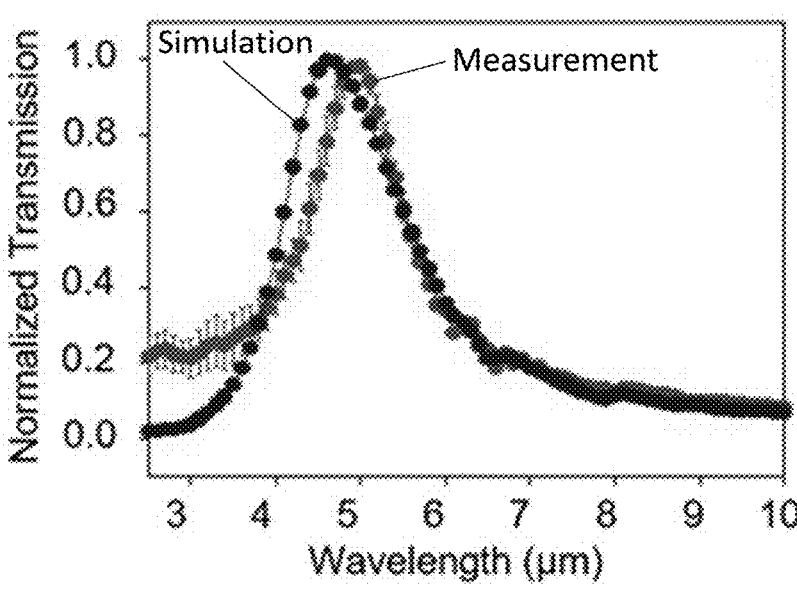
FIGS. 4A through 4F represent aspects of analysis of the IR filters of FIGS. 1A and 1B as used in IR bandpass filtering.
Figure 4B:
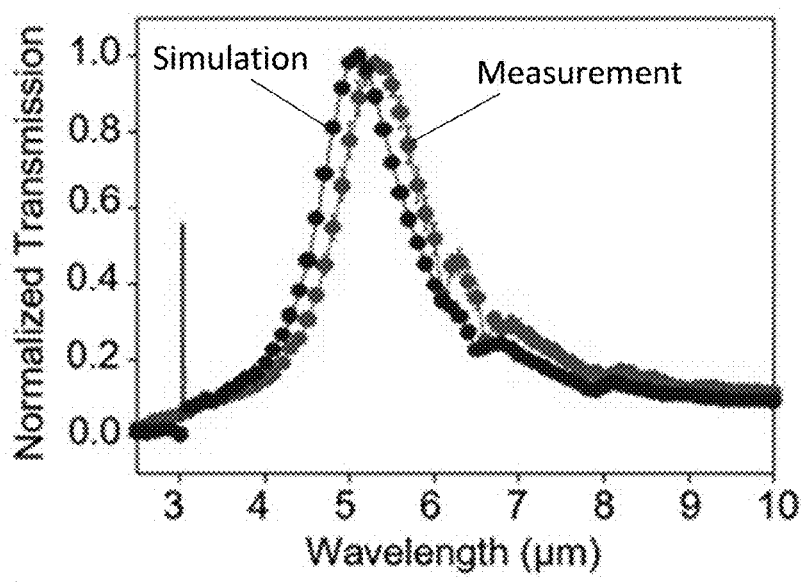

FIGS. 4A and 4B represent experimental and computational results for the transmission filter effect of the quasi-3D plasmonic IR filters 10 and 12. The transmissions of these IR filters 10 and 12 were measured at normal incidence using a Fourier transform infrared (FTIR) spectrometer in a wavelength range of 2.5-10.0 m. An unpolarized FTIR beam was used to measure the transmission. The results showed that bandpass filtering occurred within IR range at the peak wavelength of about 4.9 μm and about 5.3 μm for the IR filters containing nanoposts and nanoholes, respectively. The corresponding FWHMs occurred at the peak wavelength of 1.4 μm and 1.3 μm, respectively. The experimental and computational results were in an agreement with a discrepancy of less than 7% for peak wavelength and 2% for FWHM, which may come from imperfections and variation in the fabrication of molds 20. In addition, repetitive transmission spectra measured across the transferred quasi-3D posts 14 and holes 16 samples (1×1 cm$^2$) showed excellent uniformity with only small variations in spectra.

Figure 4C:
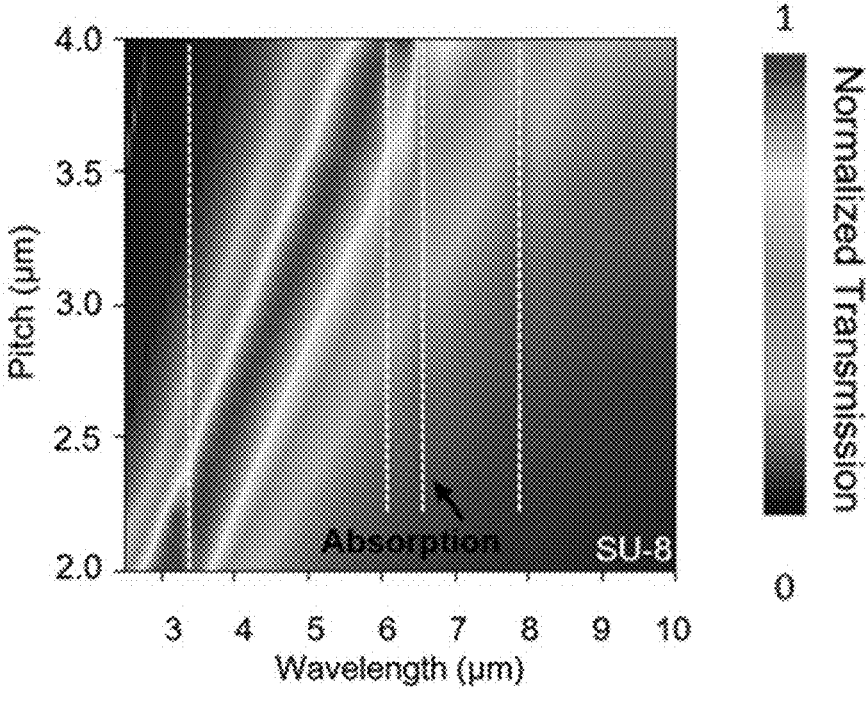
Figure 4D:
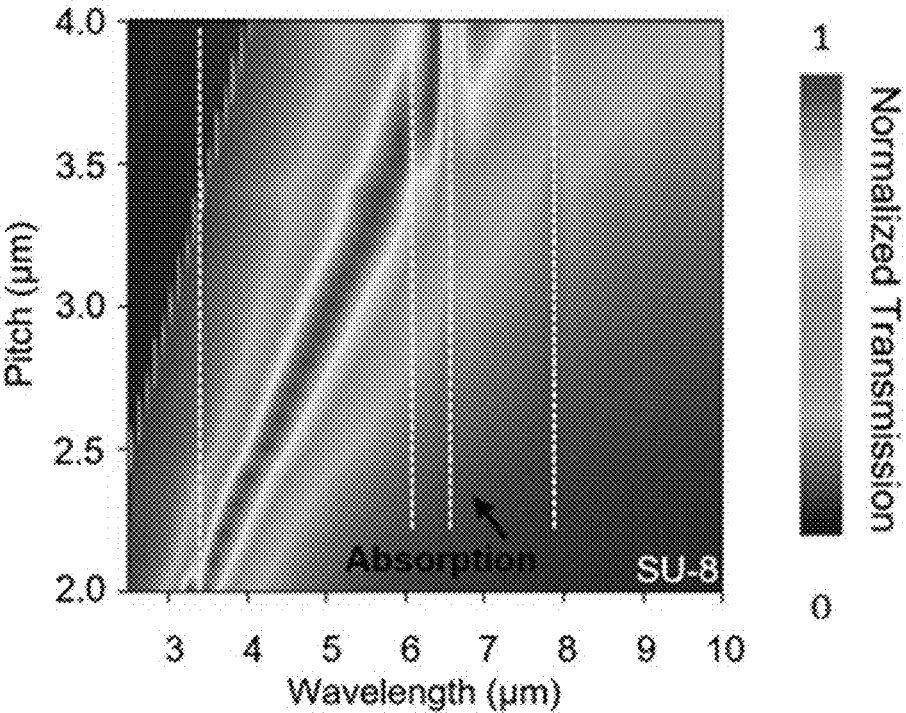
Figure 4E:
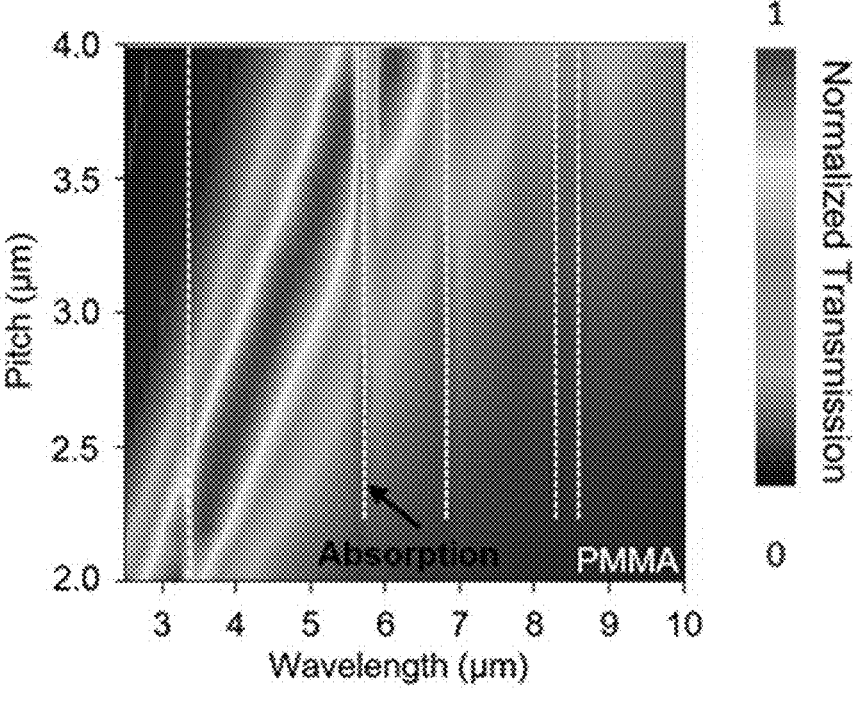
Figure 4F:
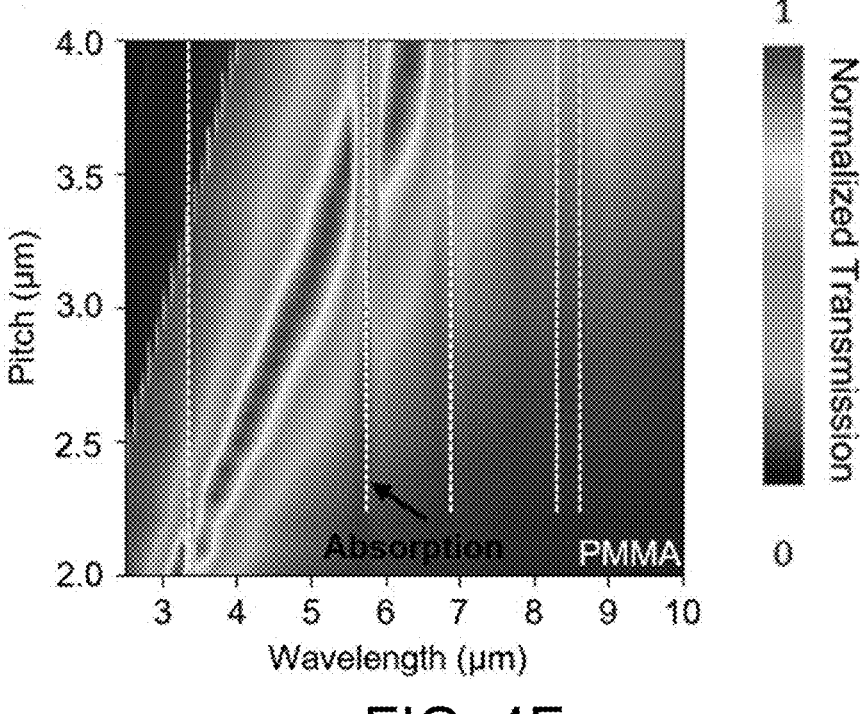

FIGS. 4C and 4D represent 2D surface plots of normalized transmission for these IR filters as functions of wavelength and periodicity (p). The results exhibited a clear spectral shift of the transmission peak toward a longer wavelength for both the nanoposts 14 (from 3.2 to 6.0 μm) and nanoholes 16 (from 3.3 to 6.3 μm) as the p increased from 2 to 4 μm. For instance, relatively weak absorptions occurred at the wavelength of 3.3, 6.2, 6.6, and 8.0 μm. The peak wavelength and FWHM of these IR filters 10 and 12 were tunable through the adjustment of their geometrical parameters such as d, $t_p$, $t_n$, and $t_d$ within the ranges of from 3 to 6 μm and from 0.5 to 2.5 μm, respectively. Data supporting such flexibility are represented in FIGS. 8A through 8D. FIGS. 4E and 4F represent the corresponding results of the IR filters that contained a PMMA spacer (1 μm-thick) as a control comparison. The results showed that strong spectral interferences (i.e., the absorption of IR radiation) occurred at wavelengths of 3.3, 5.8, 7.0, 8.3, and 8.7 μm due to the stretching vibration of C—O—C and C—H bonds in the PMMA spacer, thereby hindering IR bandpass filtering.

These investigations revealed underlying mechanisms of the fabrication method described herein thereby enabling repetitive replication of quasi-3D plasmonic IR filters 10 and 12 from molds 20, even with the presence of an extremely brittle IR-transparent dielectric spacer layer 28, such as SU-8. The mechanisms determined from the investigations enabled the reuse of molds 20 multiple times without degradation, thereby overcoming a key challenge of existing IR filter fabrications methods that involve iterative implementation of nanolithography techniques. The high replicability of the molds 20 may potentially result in a significant reduction of cost and time for the production of various IR filters. The quality, reliability, and performance of the resulting IR filters were validated through experimental and computational analyses, suggesting a route for their pragmatic application in multispectral imaging systems.

As previously noted above, though the foregoing detailed description describes certain aspects of one or more particular embodiments of the invention and investigations associated with the invention, alternatives could be adopted by one skilled in the art. For example, the IR filter and its components could differ in appearance and construction from the embodiments described herein and shown in the figures, functions of certain components of the IR filter could be performed by components of different construction but capable of a similar (though not necessarily equivalent) function, process parameters such as temperatures and durations could be modified, and appropriate materials could be substituted for those noted. As such, and again as was previously noted, it should be understood that the invention is not necessarily limited to any embodiment described herein.

The invention claimed is:

1. A method of fabricating an infrared (IR) bandpass filter, the method comprising:
  forming metallic and dielectric spacer layers on a mold, the metallic and dielectric spacer layers comprising nanoscale-sized recesses or protuberances defined by the mold;

depositing a stress-absorbing layer on the dielectric spacer layer opposite the mold;

attaching a tape to a surface of the stress-absorbing layer opposite the dielectric spacer layer;

peeling the tape away from the mold to peel and delaminate from the mold a first intermediate structure comprising the metallic layer, the dielectric spacer layer, and the stress-absorbing layer that is attached to the tape;

removing the tape from the surface of the stress-absorbing layer of the first intermediate structure to form a second intermediate structure;

selectively removing the stress-absorbing layer from the second intermediate structure with a first solvent configured to dissolve the stress-absorbing layer to define a third intermediate structure comprising the metallic layer and the dielectric spacer layer; and transferring the third intermediate structure to a receiver substrate to define the infrared (IR) bandpass filter, wherein the recesses or protuberances of the metallic and dielectric spacer layers are configured to function as quasi three dimensional (quasi 3D) plasmonic metal dielectric hybrid nanostructures.

2. The method of claim 1, wherein forming the metallic and dielectric spacer layers on the mold comprises:

providing the mold comprising an array of nanoscale-sized recesses or protuberances;

depositing a metallic material on the mold such that the metallic material is received within the recesses or between the protuberances of the mold to form the metallic layer thereon; and depositing a dielectric material on the metallic layer that is received within the recesses or between the protuberances of the mold to form the dielectric spacer layer;

wherein the nanoscale-sized recesses or protuberances of the metallic and dielectric spacer layers are defined by the array of nanoscale-sized recesses or protuberances of the mold.

3. The method of claim 2, further comprising:

depositing a sacrificial material on the array of nanoscale-sized recesses or protuberances of the mold to form a sacrificial layer thereon prior to forming the metallic and dielectric spacer layers;

forming the metallic and dielectric spacer layers such that the sacrificial layer is between the mold and the metallic layer; and performing an etching process to selectively remove the sacrificial layer prior to applying the force to the stress-absorbing layer to peel the first intermediate structure from the mold.

4. The method of claim 3, wherein the sacrificial material is a ductile metal.

5. The method of claim 3, wherein the metallic layer is a ductile metal.

6. The method of claim 1, wherein the tape comprises an adhesive, liquid-soluble film, and wherein the step of attaching the tape comprises applying the adhesive, liquid-soluble film to the stress-absorbing layer prior to applying the force to the stress-absorbing layer to peel the first intermediate structure from the mold;

wherein the step of peeling the tape away comprises applying the force to the stress-absorbing layer by pulling on the liquid-soluble film to peel the first intermediate structure from the mold, wherein the first intermediate structure comprises the liquid-soluble film, the metallic layer, the dielectric spacer layer, and the stress-absorbing layer; and selectively removing the liquid-soluble film from the first intermediate structure with a second solvent configured to dissolve the liquid-soluble film prior to removing the stress-absorbing layer.

7. The method of claim 2, further comprising forming the array of nanoscale-sized recesses or protuberances of the mold by nanolithography.

8. The method of claim 7, wherein forming the nanolithography comprises electron beam (e beam) lithography.

9. The method of claim 1, wherein the metallic and dielectric spacer layers include the nanoscale-sized recesses defined by protuberances in the mold, each of the recesses representing a nanohole.

10. The method of claim 1, wherein the metallic and dielectric spacer layers include the nanoscale-sized protuberances defined by recesses in the mold, each of the protuberances representing a nanopost.

11. The method of claim 1, wherein the metallic layer comprises gold (Au).

12. The method of claim 1, wherein the dielectric spacer layer comprises an epoxy-based composition having a fracture strain of about 2% to about 3%.

13. The method of claim 1, wherein the stress-absorbing layer comprises an acrylic.

14. The method of claim 1, wherein the stress-absorbing layer is about 0.001 to 2 μm thick.

15. The method of claim 1, further comprising fabricating an additional infrared (IR) bandpass filter with the mold.

16. A method for fabrication of an infrared (IR) bandpass filter, the method comprising:

providing a mold comprising an array of nanoscale-sized recesses or protuberances;

depositing a sacrificial material on the array of nanoscale-sized recesses or protuberances of the mold to form a sacrificial layer thereon;

depositing a metallic material comprising gold (Au) on the sacrificial layer such that the metallic material is received within the recesses or between the protuberances of the mold to form a metallic layer thereon;

depositing a dielectric material on the metallic layer that is received within the recesses or between the protuberances of the mold to form a dielectric spacer layer thereon;

depositing a stress-absorbing material on the dielectric spacer layer to form a stress-absorbing layer thereon;

performing an etching process to selectively remove the sacrificial layer;

applying an adhesive, water-soluble film to the stress-absorbing layer;

applying a force to the stress-absorbing layer by pulling on the water-soluble film to peel a first intermediate structure from the mold, wherein the first intermediate structure comprises the water-soluble film, the metallic layer, the dielectric spacer layer, and the stress-absorbing layer;

selectively removing the water-soluble film from the first intermediate structure by dissolving the water-soluble film with water to define a second intermediate structure comprising the metallic layer, the dielectric spacer layer, and the stress-absorbing layer;

selectively removing the stress-absorbing layer from the second intermediate structure by dissolving the stress-absorbing layer with acetone to define a third intermediate structure comprising the metallic layer and the dielectric spacer layer; and transferring the third intermediate structure to a receiver substrate to define the infrared (IR) bandpass filter;

wherein the metallic and dielectric spacer layers comprise nanoholes or nanoposts formed by the array of nanoscale-sized recesses or protuberances of the mold;

wherein the nanoholes or nanoposts of the metallic and dielectric spacer layers are configured to function as quasi three dimensional (quasi 3D) plasmonic metal dielectric hybrid nanostructures.

17. The method of claim 16, further comprising fabricating an additional infrared (IR) bandpass filter with the mold.

18. A method of fabricating an infrared (IR) bandpass filter, the method comprising:

forming metallic and dielectric spacer layers on a mold, the metallic and dielectric spacer layers comprising nanoscale-sized recesses or protuberances defined by the mold;

depositing a stress-absorbing layer on the dielectric spacer layer opposite the mold, wherein the stress-absorbing layer comprises an acrylic;

applying a force to the stress-absorbing layer to peel a first intermediate structure comprising the metallic layer, the dielectric spacer layer, and the stress-absorbing layer from the mold;

selectively removing the stress-absorbing layer from the first intermediate structure with a first solvent configured to dissolve the stress-absorbing layer to define a second intermediate structure comprising the metallic layer and the dielectric spacer layer; and transferring the second intermediate structure to a receiver substrate to define the infrared (IR) bandpass filter, wherein the recesses or protuberances of the metallic and dielectric spacer layers are configured to function as quasi three dimensional (quasi 3D) plasmonic metal dielectric hybrid nanostructures.

* * * * *